(12) United States Patent
Kaneko (10) Patent No.: US 10,708,462 B1
(45) Date of Patent: Jul. 7, 2020

(54) COMMUNICATION SUPPORT DEVICE AND NON-TRANSITORY COMPUTER READABLE MEDIUM

(71) Applicant: FUJI XEROX CO., LTD., Tokyo (JP)

(72) Inventor: Yoshifumi Kaneko, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/551,738

(22) Filed: Aug. 27, 2019

(30) Foreign Application Priority Data

Mar. 22, 2019 (JP) ................................ 2019-055101

(51) Int. Cl.
*H04N 1/00* (2006.01)
*H04N 1/32* (2006.01)
*H04B 17/318* (2015.01)

(52) U.S. Cl.
CPC ....... *H04N 1/0097* (2013.01); *H04N 1/00405* (2013.01); *H04N 1/32101* (2013.01); *H04B 17/318* (2015.01); *H04N 2201/0094* (2013.01)

(58) Field of Classification Search
CPC ............. H04N 1/0097; H04N 1/00405; H04N 1/32101; H04N 2201/0094; H04B 17/318
See application file for complete search history.

(56) References Cited

U.S. PATENT DOCUMENTS

2018/0183964 A1\* 6/2018 Tamura ................. H04N 1/4413
2018/0217790 A1\* 8/2018 Ichikawa .............. G06F 3/1203

FOREIGN PATENT DOCUMENTS

JP 2008217664 9/2008

\* cited by examiner

Primary Examiner — Quang N Vo
(74) Attorney, Agent, or Firm — JCIPRNET (57) ABSTRACT

A communication support device includes a user characteristics information registration unit, a waiting information producing unit, and a notification control unit. The user characteristics information registration unit registers, for each of plural users, user characteristics information, which is information indicating characteristics of the user. The waiting information producing unit produces waiting information, which is information useful for a determination, by an operating user, who is using an image forming apparatus, as to whether or not to wait for an instructing user, who has issued a printing instruction to the image forming apparatus, to visit the image forming apparatus, based on the user characteristics information of the instructing user. The notification control unit controls a notification to be transmitted to the operating user in a case where a notification condition including a condition that both the operating user and the instructing user exist is satisfied, information including information indicating that the instructing user exists and the waiting information.

15 Claims, 6 Drawing Sheets

A USER WITH CHARACTERISTICS THAT MATCH CHARACTERISTICS THAT YOU DESIRE FOR COMMUNICATION HAS ISSUED A PRINTING INSTRUCTION.

USERNAME: XX
MATCHED CHARACTERISTICS: COMPANY NAME A, JOB TYPE B
SELF-INTRODUCTION: ·········

DO YOU WISH TO SEND A MESSAGE TO THIS USER?

| I AM WAITING AT THE MULTIFUNCTION APPARATUS |

FIG. 6

A USER WITH CHARACTERISTICS THAT MATCH CHARACTERISTICS THAT YOU DESIRE FOR COMMUNICATION HAS ISSUED A PRINTING INSTRUCTION.

| DISPLAY DETAILED INFORMATION |

FIG. 7

COMMUNICATION SUPPORT DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-055101 filed Mar. 22, 2019.

BACKGROUND

(i) Technical Field

The present disclosure relates to a communication support device and a non-transitory computer readable medium.

(ii) Related Art

An image forming apparatus may be shared among a plurality of tenants in a shared office.

SUMMARY

In the case where an image forming apparatus to be shared among a plurality of users is installed in a place, such as a shared office, used by a plurality of users, communications may occur among users near the image forming apparatus.

However, such communications may be unlikely to occur unless, for example, users visit the image forming apparatus at the same time by chance.

As a technique regarding communications, a collaboration support system is disclosed in Japanese Unexamined Patent Application Publication No. 2008-217664. In this system, idea information is registered with a collaboration support server. In the case where it is detected that a person different from a tenant whose idea information is registered passes by an electronic bulletin board, the idea information is displayed on the electronic bulletin board. However, this technique does not address the above-mentioned problem.

Aspects of non-limiting embodiments of the present disclosure relate to providing a communication support device that is capable of notifying a user who is using an image forming apparatus that there is a user who has issued a printing instruction to the image forming apparatus and providing the user who is using the image forming apparatus with information for determining whether or not to wait at the image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a communication support device including a user characteristics information registration unit, a waiting information producing unit, and a notification control unit. The user characteristics information registration unit registers, for each of a plurality of users, user characteristics information, which is information indicating characteristics of the user. The waiting information producing unit produces waiting information, which is information useful for a determination, by an operating user, who is using an image forming apparatus, as to whether or not to wait for an instructing user, who has issued a printing instruction to the image forming apparatus, to visit the image forming apparatus, based on the user characteristics information of the instructing user. The notification control unit controls a notification to be transmitted to the operating user in a case where a notification condition including a condition that both the operating user and the instructing user exist is satisfied, information including information indicating that the instructing user exists and the waiting information.

BRIEF DESCRIPTION OF THE DRAWINGS

Exemplary embodiments of the present disclosure will be described in detail based on the following figures, wherein.

DETAILED DESCRIPTION

An exemplary embodiment of the present disclosure will be described below.

Figure 1:
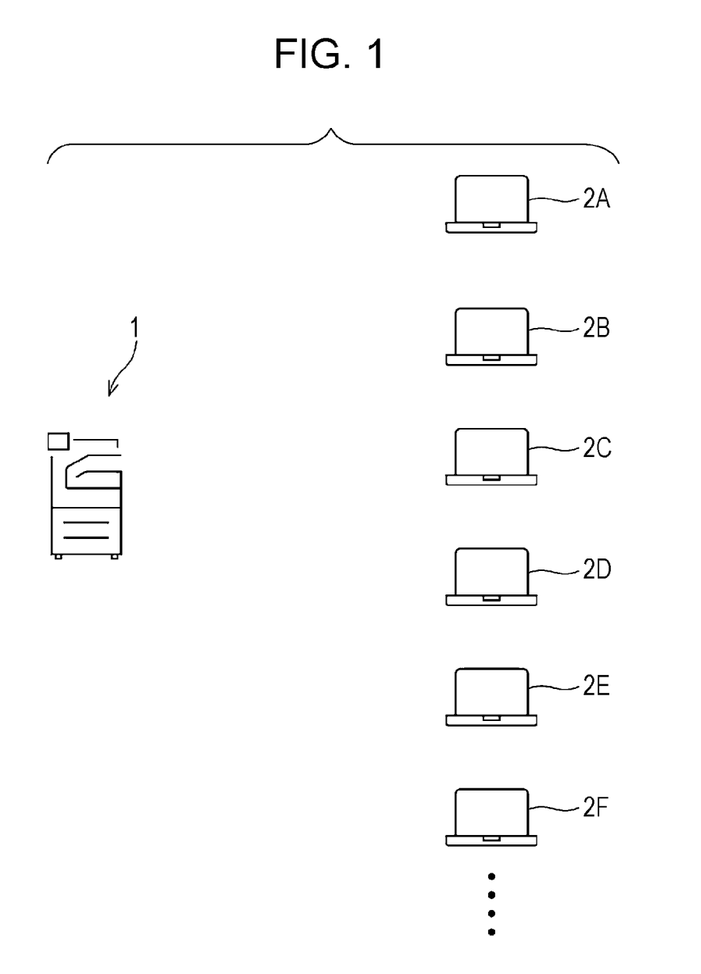
FIG. 1 is a schematic diagram of a communication support system.

FIG. 1 is a schematic diagram of a communication support system.

As illustrated in FIG. 1, the communication support system includes an image forming apparatus 1 and a plurality of terminal apparatuses 2A, 2B, 2C, and so on. Hereinafter, the plurality of terminal apparatuses 2A, 2B, 2C, and so on will be simply referred to as terminal apparatuses 2 in the case where they are not particularly distinguished from one another.

The image forming apparatus 1 is installed in a place, such as a shared office, where a plurality of users share an office space.

The plurality of terminal apparatuses 2 are terminal apparatuses used by a plurality of users who share an office such as a shared office.

The terminal apparatuses 2 may not be notebook computers as illustrated in FIG. 1. For example, the terminal apparatuses 2 may be portable terminal apparatuses such as laptop computers, tablet computers, or smartphones.

The image forming apparatus 1 is an apparatus that forms an image on a medium such as paper.

The image forming apparatus 1 is also a multifunction apparatus and includes a plurality of functions such as a scanner function and a facsimile transmission/reception function, as well as a printing function and a copy function.

The image forming apparatus 1 is an apparatus shared among a plurality of users as tenants in a shared office (that is, a shared apparatus). The image forming apparatus 1 is installed, for example, in a space that may be used by a plurality of users, such as a shared space in a shared office.

Each user holds an individual ID to use the image forming apparatus 1. Each user is able to be authenticated by placing an ID card over a card reader of the image forming apparatus 1 or inputting a username to a panel of the image forming apparatus 1. Means for authentication is not necessarily placing the ID card over the card reader or inputting the username to the panel. Authentication may be performed by face authentication, fingerprint authentication, iris authentication, or the like. When a user is authenticated, the user becomes able to use various functions of the image forming apparatus 1.

A flow of a case where the printing function of the image forming apparatus 1 is used will be explained.

First, a user performs an operation on a terminal apparatus 2 or another terminal apparatus for printing with the image forming apparatus 1. Then, the terminal apparatus 2 or the other terminal apparatus generates a printing instruction in accordance with the operation described above, and transmits the printing instruction to the image forming apparatus 1. The image forming apparatus 1 receives the printing instruction and temporarily holds the printing instruction. Next, the user visits the image forming apparatus 1, receives authentication for the image forming apparatus 1, and operates the image forming apparatus 1. Thus, the image forming apparatus 1 starts execution of the printing instruction, and printing according to the printing instruction is performed. An instructing user, which will be described later, represents, for example, a user who issues a printing instruction to the image forming apparatus 1 by performing an operation for printing. In contrast, an operating user represents a user who visits the image forming apparatus 1, receives authentication for the image forming apparatus 1, and operates the image forming apparatus 1. A state in which the image forming apparatus 1 is being used represents not only a state in which the apparatus is being operated by a user being in contact with the image forming apparatus 1 but also a state in which execution of a printing instruction is started but printing is not completed and a state in which an authentication state is maintained even after printing is completed, printing is interrupted, or an output material is not removed.

(Functional Configuration of Communication Support System)

Figure 2:
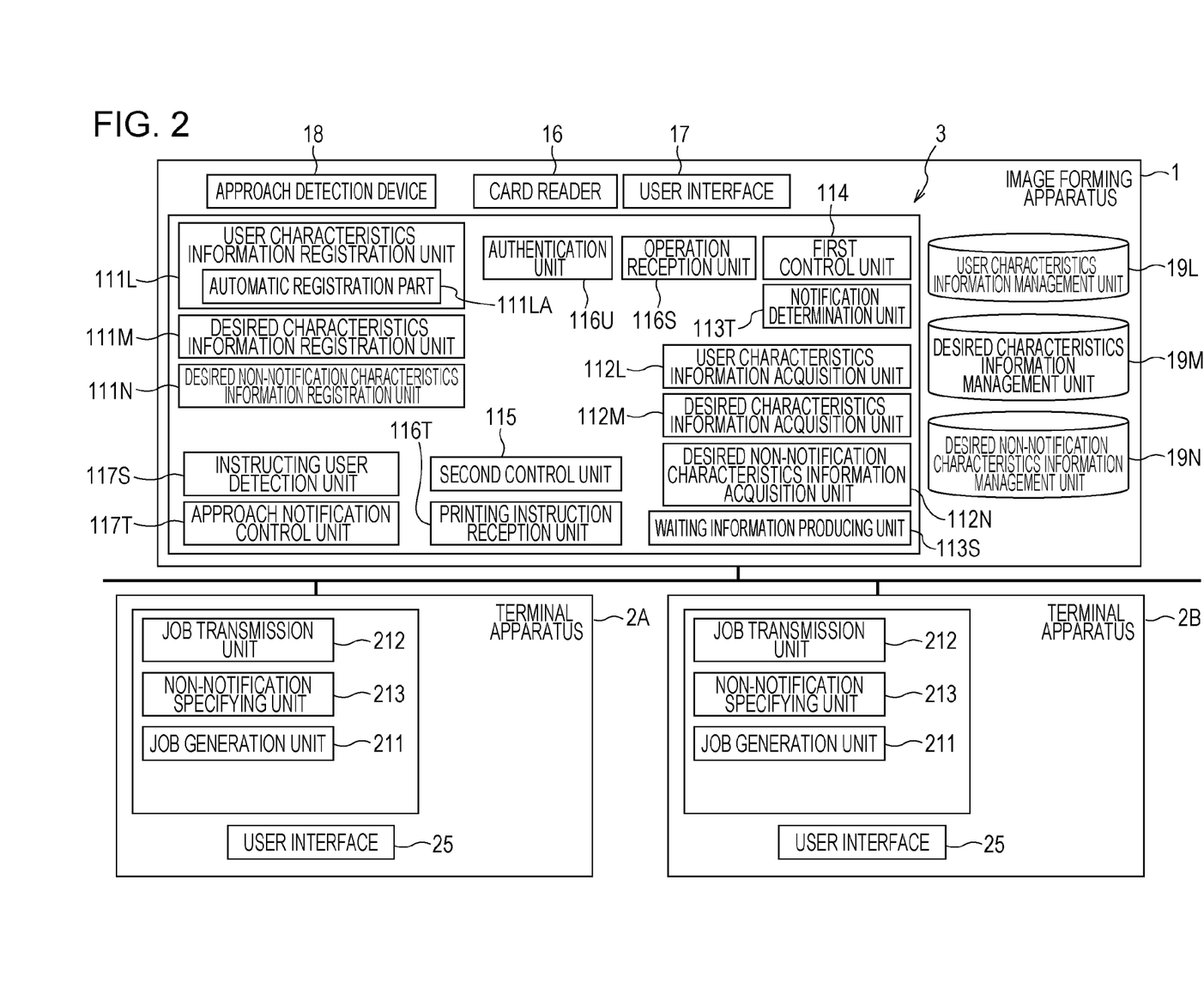
FIG. 2 is a functional configuration diagram of a communication support system according to an exemplary embodiment.

FIG. 2 is a diagram illustrating a functional configuration of a communication support system according to an exemplary embodiment.

(Communication Support System)

The image forming apparatus 1 of the communication support system according to this exemplary embodiment includes a communication support device 3.

However, the present disclosure is not limited to this.

The image forming apparatus 1 may not include the communication support device 3. The communication support device 3 may be provided, separately from the image forming apparatus 1, on a network connected to the image forming apparatus 1 and the terminal apparatuses 2.

The image forming apparatus 1 that includes the communication support device 3 will be described below.

The image forming apparatus 1 includes a user characteristics information management unit 19L, a desired characteristics information management unit 19M, and a desired non-notification characteristics information management unit 19N. Hereinafter, user characteristics information management unit 19L, the desired characteristics information management unit 19M, and the desired non-notification characteristics information management unit 19N will be simply referred to as management units 19 in the case where they are not particularly distinguished from one another.

The management units 19 are configured to manage (also store) information regarding users. The management units 19 each include a memory device such as a hard disk drive (HDD), a solid state drive (SSD), or the like.

The user characteristics information management unit 19L is configured to manage user characteristics information. The user characteristics information represents information indicating characteristics of a user.

Characteristics of a user represent the user's carrier, department, preference, and the like. Type of industry, type of job, qualifications, specialties, area of interest, hobbies, and the like are included in the characteristics of a user. In the present disclosure, characteristics of a user represent a concept including identification information of a user (for example, a username).

The desired characteristics information management unit 19M is configured to manage desired characteristics information. The desired characteristics information represents information indicating characteristics that a user desires for communication. The characteristics that a user desires for communication represent characteristics of another user with whom the user desires to communicate.

Characteristics mentioned above correspond to characteristics indicated by user characteristics information registered with a user characteristics information registration unit 111L.

The desired non-notification characteristics information management unit 19N is configured to manage desired non-notification characteristics information.

The desired non-notification characteristics information represents (1) in a case where a user is an operating user, characteristics of an instructing user for which the fact that the instructing user has issued a printing instruction is desired not to be notified to the operating user and (2) in a case where a user is an instructing user, characteristics of an operating user who is using the image forming apparatus to whom a fact that the instructing user has issued a printing instruction is desired not to be notified.

The desired non-notification characteristics information management unit 19N manages the above mentioned information (1) and information (2) separately.

The characteristics mentioned above also correspond to user characteristics information registered with the user characteristics information registration unit 111L.

The image forming apparatus 1 also includes, as a functional configuration, the user characteristics information registration unit 111L, a desired characteristics information registration unit 111M, and a desired non-notification characteristics information registration unit 111N. Hereinafter, the user characteristics information registration unit 111L, the desired characteristics information registration unit 111M, and the desired non-notification characteristics information registration unit 111N will be simply referred to as registration units 111 when they are not particularly distinguished from one another.

The user characteristics information registration unit 111L registers user characteristics information with the user characteristics information management unit 19L.

Basically, registration by the user characteristics information registration unit 111L is performed after a registration operation by a corresponding user or a registration operation by an administrator of the system is received. The registration operation may be implemented by selection using a pull-down menu, input of text, or the like.

The desired characteristics information registration unit 111M registers desired characteristics information with the desired characteristics information management unit 19M.

Basically, registration by the desired characteristics information registration unit 111M is performed after a registration operation by a corresponding user or a registration operation by an administrator of the system is received. The registration operation may be implemented by selection using a pull-down menu, input of text, or the like. However, registration by the desired characteristics information registration unit 111M may be automatically performed, as described later.

The desired non-notification characteristics information registration unit 111N registers desired non-notification characteristics information with the desired non-notification characteristics information registration unit 111N.

Basically, registration by the desired non-notification characteristics information registration unit 111N is performed after a registration operation by a corresponding user or a setting operation by an administrator of the system is received.

For example, in the case where a user does not wish to show his/her own information to staff of a competing company or the like, the user performs a setting operation for registering the name of a company, the type of industry, and the like as desired non-notification characteristics information.

The image forming apparatus 1 also includes, as a functional configuration, a user characteristics information acquisition unit 112L, a desired non-notification characteristics information acquisition unit 112N, a desired characteristics information acquisition unit 112M, a notification determination unit 113T, a waiting information producing unit 113S, and a first control unit 114.

Figure 3:
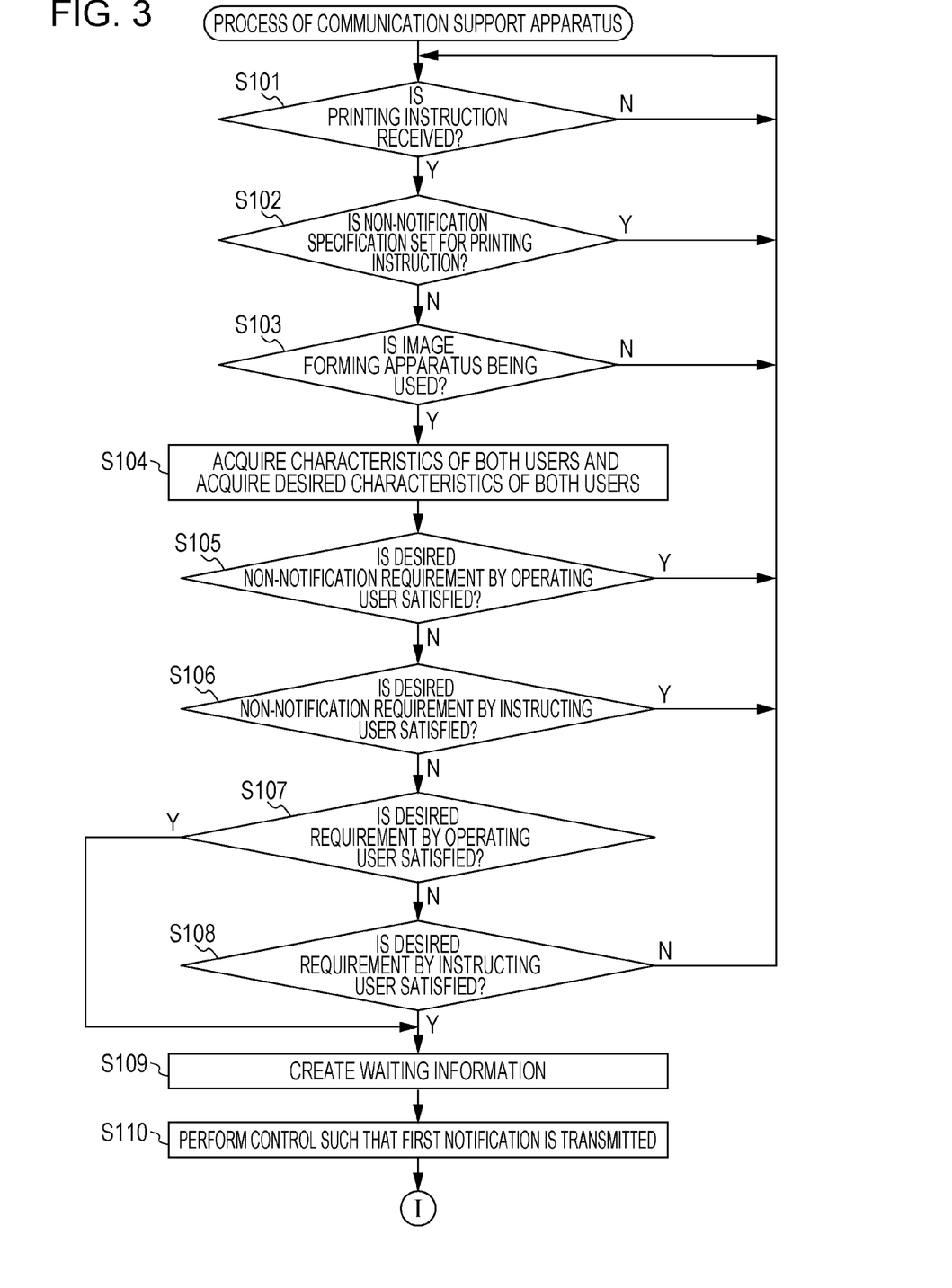
FIG. 3 is a flowchart illustrating a process performed by an image forming apparatus according to an exemplary embodiment.
Figure 4:
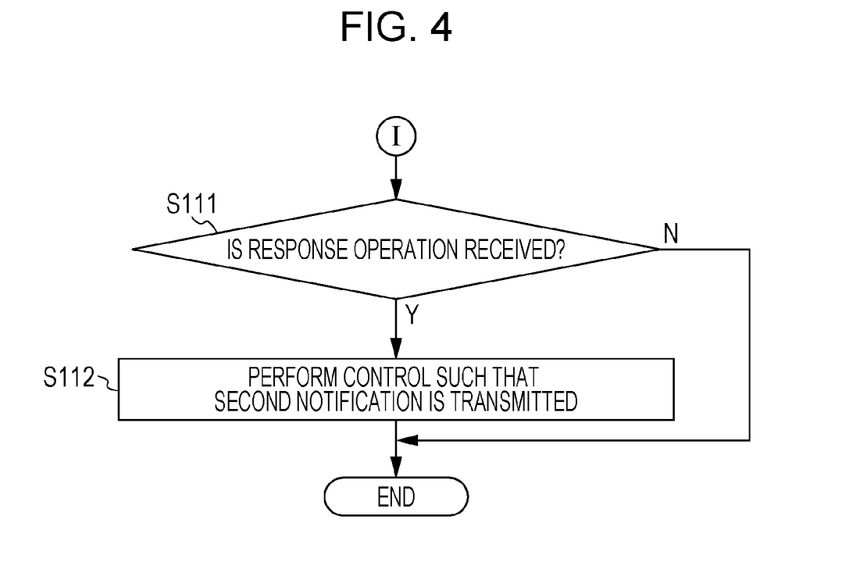
FIG. 4 is a flowchart illustrating a process performed by an image forming apparatus according to an exemplary embodiment.

Explanation for these functional units will be provided in explanation for processes illustrated by flowcharts in FIGS. 3 and 4.

The image forming apparatus 1 also includes, as a functional configuration, an operation reception unit 116S that receives an operation for a user interface 17 of the image forming apparatus 1 and a second control unit 115.

The second control unit 115 controls a response notification. The response notification represents a notification including contents corresponding to an operation received by the operation reception unit 116S as response information and is transmitted to an instructing user from the terminal apparatus 2 used by the instructing user.

Figure 7:
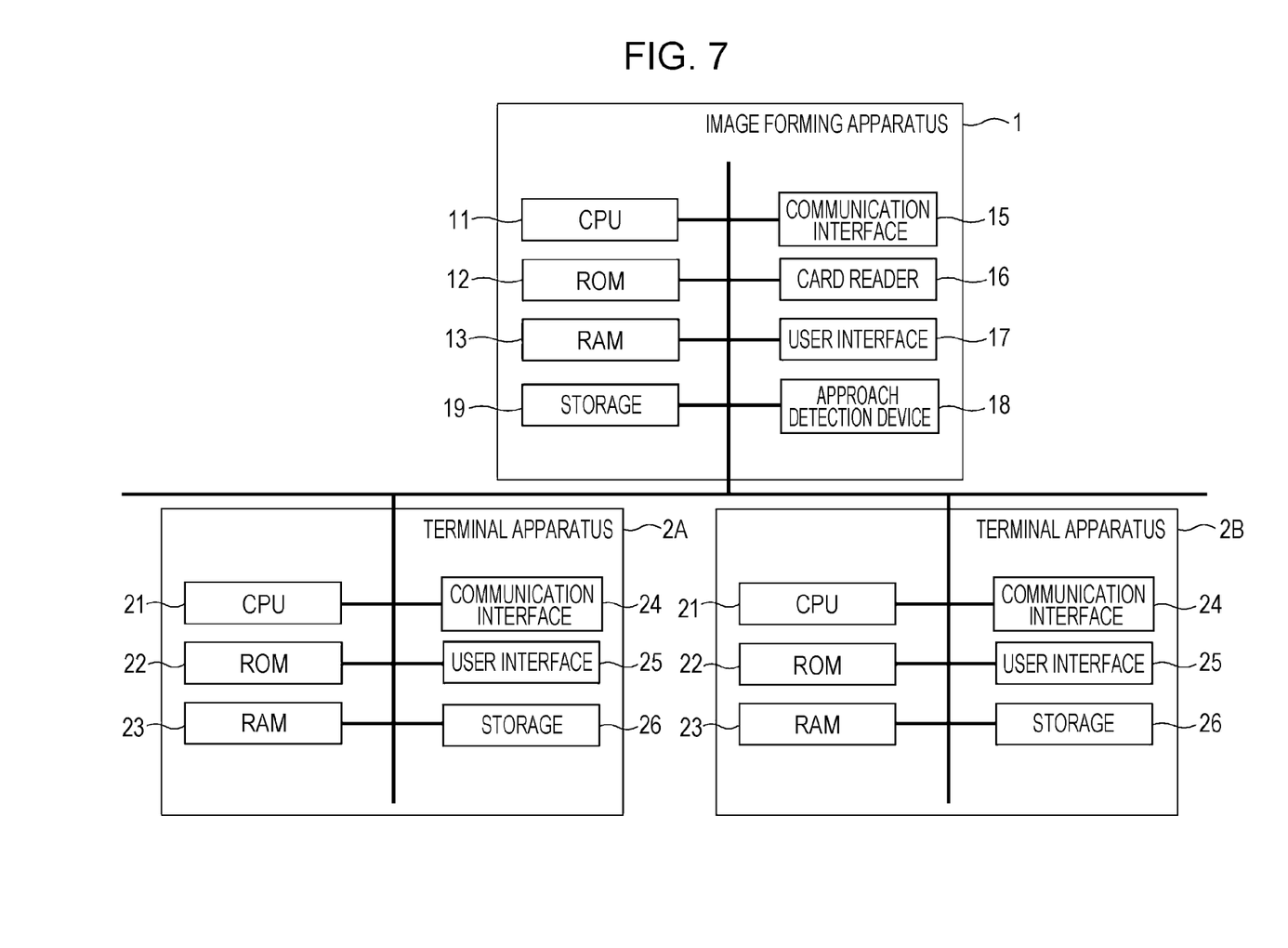
FIG. 7 is a block diagram illustrating a hardware configuration of a communication support system according to an exemplary embodiment.

FIG. 7 is a block diagram illustrating a hardware configuration of the communication support system according to this exemplary embodiment.

As illustrated in FIG. 7, the image forming apparatus 1 includes a central processing unit (CPU: processor) 11, a read only memory (ROM) 12, a random access memory (RAM) 13, a storage 19, a communication interrace 15, a card reader 16, a user interface 17, and an approach detection device 18. These components are connected via a bus such that they are able to communicate with one another.

The CPU 11 is a central processing unit. The CPU 11 executes various programs and controls individual units. That is, the CPU 11 reads a program from the ROM 12 or the storage 19, and executes the program using the RAM 13 as an operation region. The CPU 11 performs control of the individual components and various arithmetic processes in accordance with the program recorded in the ROM 12 or the storage 19. In this exemplary embodiment, a program for communication support is stored in the ROM 12 or the storage 19.

The ROM 12 stores various programs and various data. The RAM 13, as an operation region, temporarily stores programs and data. The storage 19 includes an HDD or an SSD and stores various programs including an operating system and various data.

The communication interface 15 is an interface for allowing the image forming apparatus 1 to communicate with another apparatus. For example, standards such as Ethernet, FDDI, Wi-Fi®, or the like are used.

The functional units as the functional configuration of the image forming apparatus 1 described above are implemented when the CPU 11 reads a program for communication support stored in the ROM 12 or the storage 19 and executes the program. The program may be stored in a non-transitory storing medium and provided.

The terminal apparatuses 2 include the hardware configuration illustrated in FIG. 7. Detailed explanation for the hardware configuration will be omitted.

(Flow of Process)

Next, the flow of a process performed by a communication support system according to an exemplary embodiment will be explained.

FIG. 3 is a flowchart illustrating a process performed by the image forming apparatus 1.

In step S101, the image forming apparatus 1 determines whether or not a printing instruction reception unit 116T has received a printing instruction.

In the case where the printing instruction reception unit 116T has not received a printing instruction, the image forming apparatus 1 repeats the processing of step S101.

In the case where the printing instruction reception unit 116T has received a printing instruction, the image forming apparatus 1 proceeds the process to step S102.

In step S102, the image forming apparatus 1 determines whether or not non-notification specification is set for the received printing instruction.

In the case where non-notification specification is set for the printing instruction, the image forming apparatus 1 returns the process to step S101.

In the case where non-notification specification is not set for the printing instruction, the image forming apparatus 1 proceeds the process to step S103.

In this exemplary embodiment, for printing at the image forming apparatus 1, a user operates his/her own terminal apparatus 2, so that a printing instruction is transmitted to the image forming apparatus 1. In the case where printing contents are highly confidential or the like, the user specifies, in an operation for transmitting a printing instruction, that an operating user is not notified that the user has issued the printing instruction. That is, in the case where the printing contents are highly confidential or the like, the user specifies, in the operation for transmitting the printing instruction, non-notification (that is, specifies that the operating user is not notified that the printing instruction has been issued).

That is, the communication support system according to this exemplary embodiment includes, as a functional configuration, a non-notification specifying unit 213. The non-notification specifying unit 213 specifies non-notification for a printing instruction by an instructing user, in accordance with an operation by the instructing user.

Furthermore, the non-notification specifying unit 213 according to this exemplary embodiment specifies non-notification for a printing instruction by an instructing user, in accordance with document contents for the printing instruction by the instructing user. Specifically, for example, the non-notification specifying unit 213 refers to the file name or document contents of a document file as the document contents for a printing instruction, and specifies non-notification. For example, the determination by the non-notification specifying unit 213 as to whether or not non-notification is to be specified for a printing instruction is made based on whether or not information indicating that document contents are highly confidential, such as "Confidential" or "Internal Use Only", is included in the file name or the document contents.

In step S103, the image forming apparatus 1 determines whether or not the image forming apparatus 1 is being used.

In this exemplary embodiment, the determination as to whether or not the image forming apparatus 1 is being used is made based on whether or not the image forming apparatus 1 is performing authentication.

In the case where the image forming apparatus 1 is not being used, the image forming apparatus 1 returns the process to step S101.

In the case where the image forming apparatus 1 is being used, the image forming apparatus 1 proceeds the process to step S104.

In the processing of steps S101 and S103, a determination regarding a condition that both an operating user and an instructing user are present, as a notification condition for a first notification, is performed.

In step S104, the image forming apparatus 1 acquires, as the user characteristics information acquisition unit 112L, user characteristics information of the operating user and the instructing user. Furthermore, the image forming apparatus 1 acquires, as the desired characteristics information acquisition unit 112M, desired characteristics information of the operating user and the instructing user. Furthermore, the image forming apparatus 1 acquires, as the desired non-notification characteristics information acquisition unit 112N, desired non-notification characteristics information of the operating user and the instructing user.

In step S105, the image forming apparatus 1 determines, as the notification determination unit 113T, whether or not the user characteristics information of the instructing user satisfies the desired non-notification requirement by the operating user.

The desired non-notification requirement by the operating user is defined by the desired non-notification characteristics information of the operating user. In this exemplary embodiment, the desired non-notification requirement by the operating user is that at least one of one or more characteristics indicated by the desired non-notification characteristics information of the operating user and one of one or more characteristics indicated by the user characteristics information of the instructing user match.

In the case where the user characteristics information of the instructing user satisfies the desired non-notification requirement by the operating user, the image forming apparatus 1 returns the process to step S101.

In the case where the user characteristics information of the instructing user does not satisfy the desired non-notification requirement by the operating user, the image forming apparatus 1 proceeds the process to step S106.

In step S106, the image forming apparatus 1 determines, as the notification determination unit 113T, whether or not the user characteristics information of the operating user satisfies the desired non-notification requirement by the instructing user.

The desired non-notification requirement by the instructing user is defined by the desired non-notification characteristics information of the instructing user. In this exemplary embodiment, the desired non-notification requirement by the instructing user is that at least one of one or more characteristics indicated by the desired non-notification characteristics information of the instructing user and one of one or more characteristics indicated by the user characteristics information of the operating user match.

In the case where the user characteristics information of the operating user satisfies the desired non-notification requirement by the instructing user, the image forming apparatus 1 returns the process to step S101.

In the case where the user characteristics information of the operating user does not satisfy the desired non-notification requirement by the instructing user, the image forming apparatus 1 proceeds the process to step S106.

In step S107, the image forming apparatus 1 determines, as the notification determination unit 113T, whether or not the user characteristics information of the instructing user satisfies the desired requirement by the operating user.

The desired requirement by the operating user is defined by the desired characteristics information of the operating user. In this exemplary embodiment, the desired requirement by the operating user is that at least one of one or more characteristics indicated by the desired characteristics information of the operating user and one of one or more characteristics indicated by the user characteristics information of the instructing user match.

In the case where the user characteristics information of the instructing user does not satisfy the desired requirement by the operating user, the image forming apparatus 1 proceeds the process to step S108.

In the case where the user characteristics information of the instructing user satisfies the desired requirement by the operating user, the image forming apparatus 1 proceeds the process to step S109.

In step S108, the image forming apparatus 1 determines, as the notification determination unit 113T, whether or not the user characteristics information of the operating user satisfies the desired requirement by the instructing user.

The desired requirement by the instructing user is defined by the desired characteristics information of the instructing user. In this exemplary embodiment, the desired requirement by the instructing user is that at least one of one or more characteristics indicated by the desired characteristics information of the instructing user and one of one or more characteristics indicated by the user characteristics information of the operating user match.

In the case where the user characteristics information of the operating user does not satisfy the desired requirement by the instructing user, the image forming apparatus 1 returns the process to step S101.

In the case where the user characteristics information of the operating user satisfies the desired requirement by the instructing user, the image forming apparatus 1 proceeds the process to step S109.

In step S109, the image forming apparatus 1 produces, as the waiting information producing unit 113S, waiting information.

The waiting information represents information useful for a determination by the operating user as to whether or not to wait for the instructing user to visit the image forming apparatus 1.

For example, the waiting information includes:

(A) user characteristics information of the instructing user;

(B) information not including user characteristics information of the instructing user and indicating that the user characteristics information of the instructing user satisfies a desired requirement by the operating user; and (C) information not including user characteristics information of the instructing user and indicating that user characteristics information of the operating user satisfies a desired requirement by the instructing user.

In the case of (A), the user characteristics information of the instructing user may be useful for a determination by the operating user as to whether or not to wait for the instructing user to visit the image forming apparatus 1.

The case (B) in which the user characteristics information of the instructing user satisfies the desired requirement by the operating user and the case (C) in which the user characteristics information of the operating user satisfies the desired requirement by the instructing user may be useful for a determination by the operating user as to whether or not to wait for the instructing user to visit the image forming apparatus 1.

Processing of the waiting information producing unit 113S for using the user characteristics information of the instructing user registered by the user characteristics information registration unit 111L as waiting information also corresponds to "producing" in the present disclosure.

In step S110, the image forming apparatus 1 performs, as the first control unit 114, control such that a notification (first notification) is transmitted to the operating user.

For example, the image forming apparatus 1 performs control such that notification information is displayed on an operation panel, which is the user interface 17 of the image forming apparatus 1, or on a portable terminal apparatus of the operating user or control such that notification sound is produced.

The notification information by the first notification includes the waiting information. Thus, with the first notification, the user who is using the image forming apparatus may be provided information for determining whether or not to wait at the image forming apparatus, as well as notified that there is a user who has issued a printing instruction to the image forming apparatus.

Figure 5:
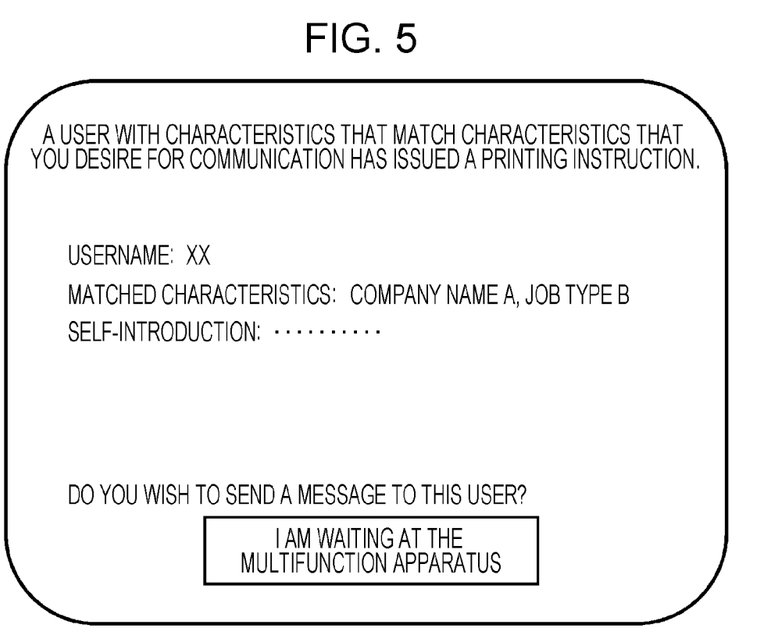
FIG. 5 illustrates an example of a display screen for transmitting a notification to an operating user.

The notification information by the first notification may be information indicating only any one or more of the above-mentioned (A), (B), and (C) or may indicate the matters listed below:

(1) type of industry, type of job, and qualifications of the instructing user (2) characteristics other than type of industry, type of job, qualifications (for example, hobbies);

(3) information useful for identifying the notified instructing user, such as appearance of the instructing user (for example, a face photo of the instructing user); and (4) information with high confidentiality such as contact details, idea information, and a self-introduction sentence An example of display of notification information is illustrated in FIG. 5. The display illustrated in FIG. 5 provides information indicating that user characteristics information of an instructing user satisfies a desired requirement by an operating user. A display portion "A user with characteristics that match characteristics that you desire for communication (has issued a printing instruction)." corresponds to the information.

Furthermore, the display illustrated in FIG. 5 provides user characteristics information of an instructing user. A display portion "Username: User A, Matched characteristics: company name A, job type B" corresponds to the user characteristics information. As described above, in the present disclosure, the term "characteristics" represents a concept including a username. Therefore, it may be said that the display illustrated in FIG. 5 provides both a username and characteristics other than the username. Regarding display of characteristics other than information necessary for identifying a user such as a username, only matched characteristics may be displayed, whereas non-matched characteristics may not be displayed.

It may also be said that a display portion "Self-introduction: . . . " provides characteristics of an instructing user. Accordingly, to display a self-introduction sentence (or contact details, idea information, etc.), the communication support device 3 may be configured as described below, for example.

That is, the user characteristics information management unit 19L is configured to be able to manage a self-introduction sentence of a user. The user characteristics information registration unit 111L is configured to be able to register the self-introduction sentence of the user with the user characteristics information management unit 19L in response to an operation by the user.

However, a self-introduction sentence registered as user characteristics information may only be used by the waiting information producing unit 113S to produce waiting information and may not be used by the notification determination unit 113T to perform notification determination.

Figure 6:
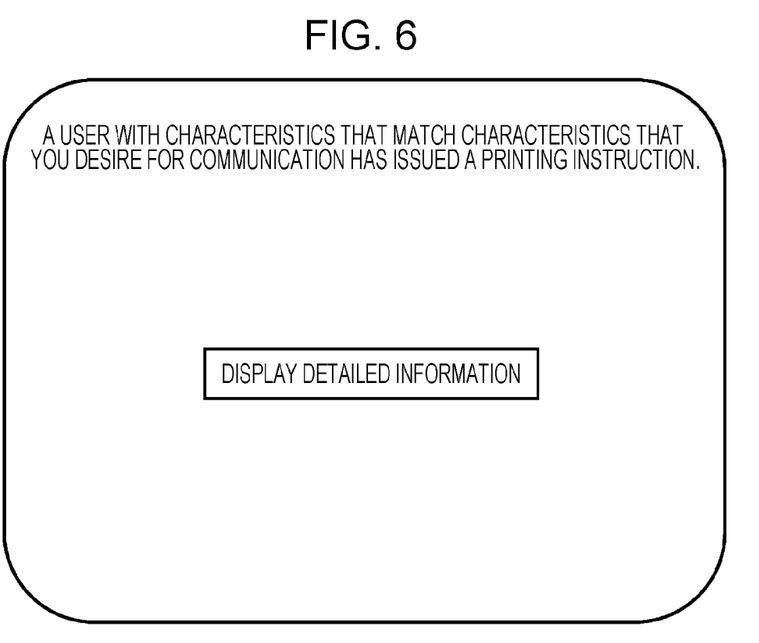
FIG. 6 illustrates an example of a display screen for transmitting a notification to an operating user.

A modification of notification by the first control unit 114 will be explained below with reference to FIG. 6.

In this modification, first, the first control unit 114 causes user information with low confidentiality (in FIG. 6, information indicating that user characteristics information of an instructing user satisfies a desired requirement by an operating user) and a button for "display detailed information" to be displayed on the operation panel.

Next, when the button for "display detailed information" is pressed, the first control unit 114 transfers information with high confidentiality regarding the instructing user to an e-mail address or the like registered in advance by the operating user. In collaboration with an application of a portable terminal apparatus, a portable terminal apparatus as a transmission destination may be identified based on authentication information, terminal identification information, and the like registered in advance, and information with high confidentiality may be transmitted to the transmission destination. In FIG. 6, only the "display detailed information" button is displayed. However, a "transfer to terminal" button as well as the "display detailed information" button may be displayed. When the "transfer to terminal" button is pressed, information with high confidentiality may be transferred to a specified portable terminal apparatus, along with user information with low confidentiality.

(Process after First Notification)

FIG. 4 is a flowchart illustrating a process performed by the image forming apparatus 1 subsequent to the process illustrated in FIG. 3.

In step S111, the image forming apparatus 1 determines, as the notification determination unit 113T, whether or not the operation reception unit 116S has received a response operation.

The response operation represents an operation performed for the image forming apparatus 1 or a portable terminal apparatus of an operating user to transmit a response notification to an instructing user. In this exemplary embodiment, as illustrated in FIG. 5, on the display screen for notification to the operating user, a message "Do you wish to send a message to this user?" and a GUI button "I am waiting at the multifunction apparatus." are provided. The response operation in this exemplary embodiment corresponds to pressing the GUI button.

In the case where no response operation is performed (for example, in the case where the button is not pressed within a predetermined period or in the case where the button is not pressed within a period during which the operating user is authenticated, step S111: No), the image forming apparatus 1 ends the process.

In the case where a response operation is performed (step S111: Yes), the image forming apparatus 1 proceeds the process to step S112.

In step S112, the image forming apparatus 1 performs, as the second control unit 115, control such that a response notification indicating contents corresponding to the response operation is transmitted to the instructing user.

Specifically, the image forming apparatus 1 transmits, as the second control unit 115, a response instruction (signal for a second notification) to the terminal apparatus 2 of the instructing user.

In this exemplary embodiment, when the button illustrated in FIG. 5 is pressed by the operating user, a message "I am waiting at the multifunction apparatus." is displayed on a display device, which is a user interface 25 of the terminal apparatus 2 of the instructing user, in accordance with the response instruction transmitted by the second control unit 115.

(Approach Notification Control)

Furthermore, the communication support device 3 of the communication support system according to this exemplary embodiment includes an instructing user detection unit 117S and an approach notification control unit 117T.

The instructing user detection unit 117S detects that an instructing user has approached the image forming apparatus 1.

Specifically, the instructing user detection unit 117S detects, based on a signal from the approach detection device 18 provided in the image forming apparatus 1, that an instructing user has approached the image forming apparatus 1. The approach detection device 18 may be, for example, a device that communicates, based on electronic waves, with a portable terminal apparatus carried by an instructing user. In this case, the instructing user detection unit 117S detects, based on the intensity of electronic waves in communication between the approach detection device 18 and the portable terminal apparatus of the instructing user, that the instructing user has approached the image forming apparatus 1. For example, a device using ultrasonic waves or a camera may also be used as the approach detection device 18.

The approach notification control unit 117T performs approach notification control in the case where a notification condition that a user is detected by the instructing user detection unit 117S is satisfied. The approach notification control represents control for transmitting approach notification information as notification information. The approach notification information represents information indicating that an instructing user has approached the image forming apparatus.

The approach notification control represents control for transmitting a notification to an operating user. Thus, the approach notification control unit 117T controls notification by the user interface 17 of the image forming apparatus 1 and notification by the portable terminal apparatus of the operating user.

The approach notification information may be information only indicating that an instructing user has approached the image forming apparatus 1. However, the information listed below may further be included in the approach notification information:

(1) information indicating the appearance of an instructing user (for example, a face photo); and (2) other types of information useful for identifying an instructing user.

The operation user who has received the notification identifies the instructing user, based on the approach notification information.

(Notification Prohibited User)

In the communication support system according to the foregoing exemplary embodiment, a user is able to prohibit transmission of a notification to and from a specific user by registering identification information of the specific user (for example, a username), as desired non-notification characteristics of the user, with the desired non-notification characteristics information registration unit 111N.

For example, when a user is an operating user, even if a specific user issues a printing instruction, a notification indicating that the specific user has issued the instruction is not notified to the user, by registering identification information (for example, a username) of the specific user with the desired non-notification characteristics information registration unit 111N, as "(1) in a case where a user is an operating user, characteristics of an instructing user for which the fact that the instructing user has issued a printing instruction is desired not to be notified to the operating user".

In this case, it may be said that the desired non-notification characteristics information registration unit 111N functions as a notification prohibited user registration unit that registers a notification prohibited user for whom a user prohibits transmission of a notification to and from the notification prohibited user.

However, in place of the desired non-notification characteristics information registration unit 111N and the desired non-notification characteristics information management unit 19N in the foregoing exemplary embodiment, a desired non-notification characteristics information registration unit 111N that is configured not to register characteristics other than user identification information (that is, a notification prohibited user registration unit) and a desired non-notification characteristics information management unit 19N that is configured not to manage characteristics other than user identification information (that is, a notification prohibited user management unit) may be provided.

(Automatic Registration Part)

Furthermore, in the foregoing exemplary embodiment, the user characteristics information registration unit 111L is configured to include an automatic registration part 111LA. The automatic registration part 111LA automatically registers user characteristics information of a user extracted from document contents for which a printing instruction is issued by the user.

For example, the automatic registration part 111LA automatically registers extracted user characteristics information after the printing instruction reception unit 116T receives a printing instruction and before the acquisition units 112 acquire various types of information (that is, after step S101 and before step S104 in the process illustrated in FIG. 4). In this case, in step S104, the communication support device 3 acquires user characteristics information of an instructing user registered by the automatic registration part 111LA. The notification determination unit 113T uses, in notification determination, user characteristics information extracted from document contents for which a printing instruction is issued by an instructing user. Furthermore, the waiting information producing unit 113S uses, in producing waiting information, user characteristics information extracted from document contents for which a printing instruction is issued by an instructing user.

[Supplementary Explanation]

In the foregoing exemplary embodiment, an example in which the communication support device 3 includes the management units 19 has been described. However, the present disclosure is not limited to the above configuration. The management units 19 may be provided outside the communication support device 3 and on a network connected to the communication support device 3.

Furthermore, in the foregoing exemplary embodiment, an example has been provided in which a notification condition includes a condition that either or both of a condition that user characteristics information of an instructing user satisfies a desired requirement by an operating user and a condition that user characteristics information of the operating user satisfies a desired requirement by the instructing user are satisfied. In other words, in the foregoing exemplary embodiment, an example has been explained in which the first notification may be transmitted when user characteristics information of an operating user satisfies a desired requirement by an instruction user even if user characteristics information of the instructing user does not satisfy a desired requirement by the operating user. Furthermore, in other words, in the foregoing exemplary embodiment, an example has been explained in which the first notification may be transmitted when user characteristics information of an instructing user satisfies a desired requirement by an operating user even in the case where user characteristics information of the operating user does not satisfy a desired requirement by the instructing user.

However, the present disclosure is not limited to the above examples.

For example, the notification condition may include a condition that user characteristics information of an instructing user satisfies a desired requirement by an operating user. In other words, a condition that a desired requirement by an operating user is satisfied may be set as an indispensable prerequisite for transmission of the first notification.

Furthermore, for example, the notification condition may include a condition that user characteristics information of an operating user satisfies a desired requirement by an instructing user. In other words, a condition that a desired requirement by an instructing user is satisfied may be set as an indispensable prerequisite for transmission of the first notification.

Furthermore, in the foregoing exemplary embodiment, an example has been explained in which the notification condition further includes a condition that both a condition that user characteristics information of an instructing user does not satisfy a desired non-notification requirement by an operating user and a condition that user characteristics information of the operating user does not satisfy a desired non-notification requirement by the instructing user are satisfied. In other words, in the foregoing exemplary embodiment, an example has been explained in which the first notification is not transmitted in the case where user characteristics information of an instructing user does not satisfy a desired requirement by an operating user and the first notification is not transmitted in the case where user characteristics information of the operating user does not satisfy a desired requirement by the instructing user.

However, the present disclosure is not limited to the above example.

For example, the notification condition may include a condition that user characteristics information of an operating user does not satisfy a desired non-notification requirement by an instructing user but not include a condition that user characteristics information of the instructing user does not satisfy a desired non-notification requirement by the operating user.

Furthermore, for example, the notification information may not include a condition that user characteristics information of an operating user does not satisfy a desired non-notification requirement by an instructing user but include a condition that user characteristics information of the instructing user does not satisfy a desired non-notification requirement by the operating user.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A communication support device comprising:
   a user characteristics information registration unit that registers, for each of a plurality of users, user characteristics information, which is information indicating characteristics of the user;
   a waiting information producing unit that produce waiting information, which is information useful for a determination, by an operating user, who is using an image forming apparatus, as to whether or not to wait for an instructing user, who has issued a printing instruction to the image forming apparatus, to visit the image forming apparatus, based on the user characteristics information of the instructing user; and
   a notification control unit that controls a notification to be transmitted to the operating user in a case where a notification condition including a condition that both the operating user and the instructing user exist is satisfied, information including information indicating that the instructing user exists and the waiting information.

2. The communication support device according to claim 1, further comprising:
   a desired characteristics information registration unit that registers, for each of the plurality of users, desired characteristics information, which is information indicating characteristics that the user desires for communication,
   wherein the notification condition further includes a condition that either or both of a condition that the user characteristics information of the instructing user satisfies a desired requirement defined by the desired characteristics information of the operating user and a condition that the user characteristics information of the operating user satisfies a desired requirement defined by the desired characteristics information of the instructing user are satisfied.

3. The communication support device according to claim 1, further comprising:
   a desired characteristics information registration unit that registers, for each of the plurality of users, desired characteristics information, which is information indicating characteristics that the user desires for communication, wherein the notification condition further includes a condition that the user characteristics information of the instructing user satisfies a desired requirement defined by the desired characteristics information of the operating user.

4. The communication support device according to claim 1, further comprising:
a desired characteristics information registration unit that registers, for each of the plurality of users, desired characteristics information, which is information indicating characteristics that the user desires for communication,
wherein the notification condition further includes a condition that the user characteristics information of the operating user satisfies a desired requirement defined by the desired characteristics information of the instructing user.

5. The communication support device according to claim 2,
wherein the desired requirement is a requirement that at least one of one or more characteristics indicated by the desired characteristics information and one of one or more characteristics indicated by the user characteristics information match.

6. The communication support device according to claim 1, further comprising:
a desired non-notification characteristics information registration unit that registers, for each of the plurality of users, desired non-notification characteristics information,
wherein the notification condition further includes a condition that the user characteristics information of the instructing does not satisfy a desired non-notification requirement defined by the desired non-notification characteristics information of the operating user.

7. The communication support device according to claim 1, further comprising:
a non-notification specifying unit that specifies non-notification for a printing instruction by the instructing user, in accordance with an operation by the instructing user or document contents for the printing instruction by the instructing user,
wherein the notification condition further includes a condition that the non-notification is set for the printing instruction by the instructing user.

8. The communication support device according to claim 7,
wherein the document contents include a file name of a document file.

9. The communication support device according to claim 1, further comprising:
a notification prohibited user registration unit that registers, for each of the plurality of users, a notification prohibited user, transmission of the notification to and from the notification prohibited user being prohibited,
wherein the notification condition further includes a condition that the operating user is not the notification prohibited user for the instructing user.

10. The communication support device according to claim 1,
wherein the user characteristics information registration unit is configured to include an automatic registration part that automatically registers user characteristics information of a user extracted from document contents for which a printing instruction is issued by the user.

11. The communication support device according to claim 1, further comprising:
an operation reception unit that receives an operation by the operating user in a case where the notification is transmitted; and
a second control unit that controls a response notification in which contents corresponding to the operation are defined as response information, the response notification being transmitted from a terminal apparatus of the instructing user to the instructing user.

12. The communication support device according to claim 1, further comprising:
an instructing user detection unit that detects that the instruction user has approached the image forming apparatus; and
an approach notification control unit that performs approach notification control for causing the image forming apparatus to notify the operating user of, as approach notification information, information including information indicating that the instructing user has approached the image forming apparatus, in a case where an approach notification condition including a condition that the instructing user detection unit has detected the approach by the instructing user is satisfied.

13. The communication support device according to claim 12,
wherein the instructing user detection unit detects, based on intensity of electronic waves used in communication between a portable terminal apparatus carried by the instructing user and the image forming apparatus, that the instruction user has approached the image forming apparatus.

14. A non-transitory computer readable medium storing a program causing a computer to execute a process for communication support, the process comprising:
registering, for each of a plurality of users, user characteristics information, which is information indicating characteristics of the user;
producing waiting information, which is information useful for a determination, by an operating user, who is using an image forming apparatus, as to whether or not to wait for an instructing user, who has issued a printing instruction to the image forming apparatus, to visit the image forming apparatus, based on the user characteristics information of the instructing user; and
controlling a notification to be transmitted to the operating user in a case where a notification condition including a condition that both the operating user and the instructing user exist is satisfied, information including information indicating that the instructing user exists and the produced waiting information being defined as notification information in the notification.

15. A communication support device comprising:
user characteristics information registration means for registering, for each of a plurality of users, user characteristics information, which is information indicating characteristics of the user;
waiting information producing means for producing waiting information, which is information useful for a determination, by an operating user, who is using an image forming apparatus, as to whether or not to wait for an instructing user, who has issued a printing instruction to the image forming apparatus, to visit the image forming apparatus, based on the user characteristics information of the instructing user; and
control means for controlling a notification to be transmitted to the operating user in a case where a notification condition including a condition that both the operating user and the instructing user exist is satisfied, information including information indicating that the instructing user exists and the waiting information produced by the waiting information producing means being defined as notification information in the notification.

\* \* \* \* \*